United States Patent
Whalen et al.

(10) Patent No.: US 9,834,232 B2
(45) Date of Patent: Dec. 5, 2017

(54) VENTED DRAINING SLACK ADJUSTER END CAP

(71) Applicant: Westinghouse Air Brake Technologies Corporation, Wilmerding, PA (US)

(72) Inventors: Shaun T. Whalen, Chicago, IL (US); Peter Paul Gregar, Greenville, SC (US); Scott Lee Natschke, Bourbonnais, IL (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 15/015,679

(22) Filed: Feb. 4, 2016

(65) Prior Publication Data

US 2016/0229430 A1   Aug. 11, 2016

Related U.S. Application Data

(60) Provisional application No. 62/112,996, filed on Feb. 6, 2015.

(51) Int. Cl.
*B61H 15/00* (2006.01)
*B61H 13/34* (2006.01)
*F16D 65/66* (2006.01)

(52) U.S. Cl.
CPC ......... *B61H 15/0057* (2013.01); *B61H 13/34* (2013.01); *F16D 65/66* (2013.01)

(58) Field of Classification Search
CPC ...... B61H 15/0057; F16D 65/38; F16J 15/441
See application file for complete search history.

(56) References Cited

U.S. PATENT DOCUMENTS

| | | | |
|---|---|---|---|
| 3,520,387 | A | 7/1970 | Natschke |
| 3,595,347 | A | 7/1971 | Billeter |
| 4,380,276 | A | 4/1983 | Sweet et al. |
| 4,662,485 | A | 5/1987 | Kanjo et al. |

(Continued)

FOREIGN PATENT DOCUMENTS

| | | |
|---|---|---|
| KR | 1020080054613 | 6/2008 |
| WO | 2012174505 A1 | 12/2012 |

OTHER PUBLICATIONS

Universal Model 2300-DJ, Cardwell Westinghouse, Oct. 2011, 3 pgs.

(Continued)

*Primary Examiner* — Vishal Sahni
(74) *Attorney, Agent, or Firm* — The Webb Law Firm

(57) ABSTRACT

A vented cap for a main spring housing of a slack adjuster including an inner portion having an inner seal surface configured for cooperating with an elongated rod member and an outer seal surface configured for cooperating with a sidewall located at an end portion of the main spring housing. The vented end cap includes at least one opening configured to allow fluid and/or contaminants trapped within the slack adjuster and/or the end cap to drain therethrough. Various seals and/or drainage openings can also be provided along the slack adjuster to prevent the entrance of and/or allow for drainage of fluid/contaminants from the slack adjuster. A method for preventing the accumulation of fluid and/or contaminants within a slack adjuster and for protecting a critical operating area of the slack adjuster is also provided.

33 Claims, 16 Drawing Sheets

(56) References Cited

U.S. PATENT DOCUMENTS

| | | |
|---|---|---|
| 4,683,991 A | 8/1987 | Kanjo |
| 4,796,731 A | 1/1989 | Schmitt |
| 5,025,900 A | 6/1991 | Severinsson |
| 5,423,401 A | 6/1995 | Noah et al. |
| 5,476,269 A | 12/1995 | Karlsson |
| 5,615,755 A * | 4/1997 | Karlsson ................ B61H 15/00 188/198 |
| 5,975,254 A * | 11/1999 | Emilsson ................ B61H 15/00 188/196 R |
| 6,196,362 B1 | 3/2001 | Daugherty, Jr. et al. |
| 6,230,856 B1 | 5/2001 | Kanjo |
| 7,802,662 B2 | 9/2010 | Sommerfeld et al. |
| 9,272,718 B2 | 3/2016 | Huber, Jr. et al. |
| 2005/0126867 A1 | 6/2005 | Crume et al. |
| 2010/0320044 A1 | 12/2010 | Emilsson |
| 2012/0068454 A1 | 3/2012 | Hamaguchi et al. |
| 2014/0353095 A1* | 12/2014 | Huber, Jr. .......... B61H 15/0028 188/199 |
| 2015/0001016 A1 | 1/2015 | Whalen et al. |
| 2015/0075924 A1 | 3/2015 | Whalen et al. |
| 2015/0233435 A1 | 8/2015 | Huber, Jr. et al. |

OTHER PUBLICATIONS

Ellcon National, Reclamation Manual for Ellcon-National Model 2000 Series Slack Adjuster, Nov. 20, 2008, pp. 1-17, REC-20-12-99.
New York Air Brake, Technical Guide for the Product User: KRD-482-E Slack Adjuster, Jul. 2010, Rev. 03, pp. 1-2.

* cited by examiner

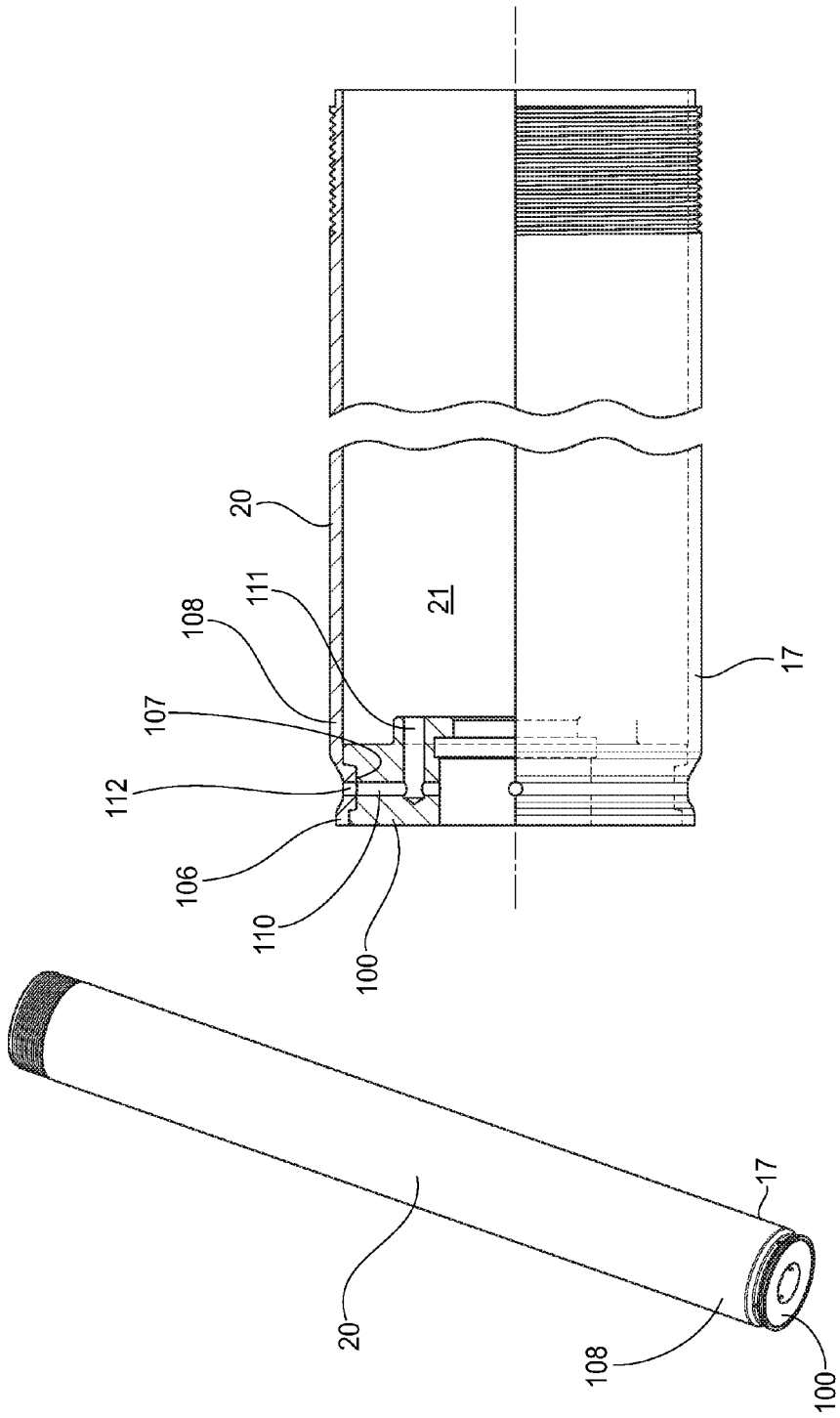

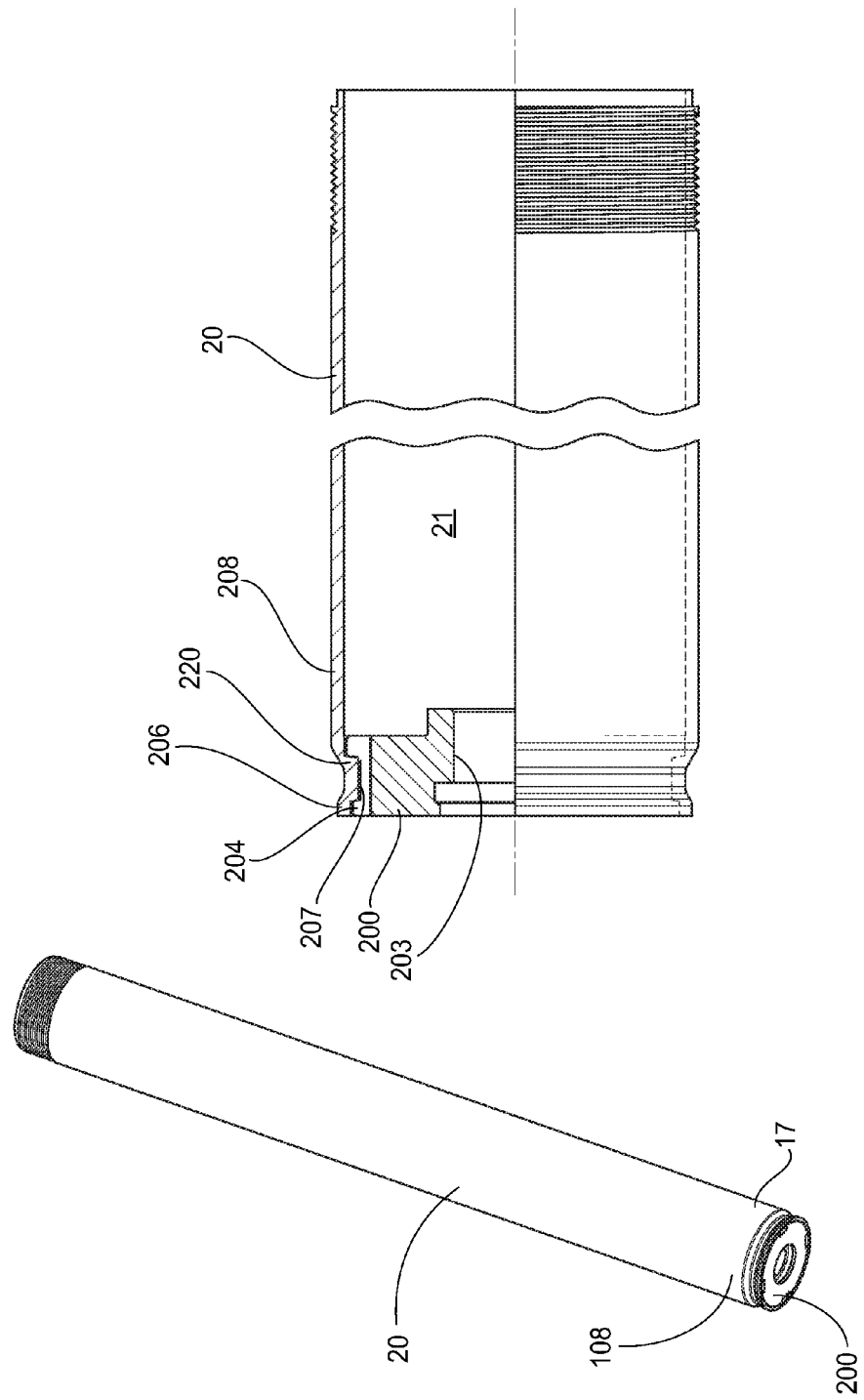

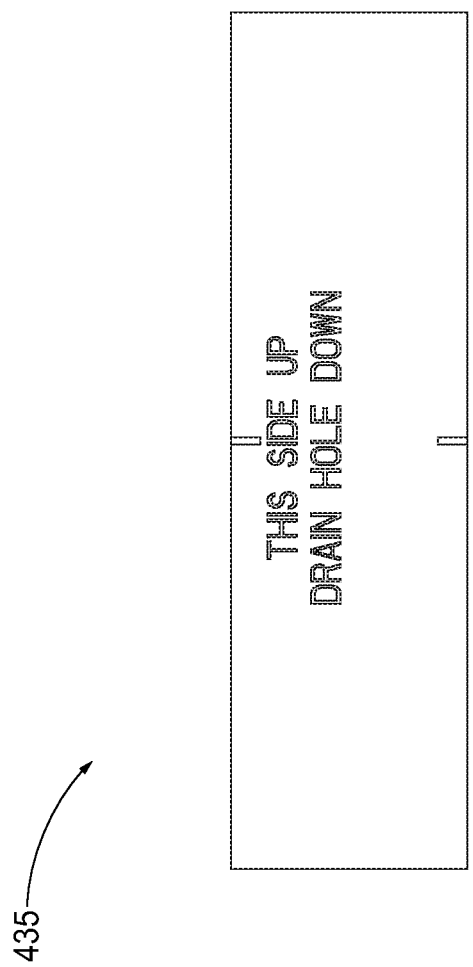

VENTED DRAINING SLACK ADJUSTER END CAP

CROSS REFERENCE TO RELATED APPLICATIONS

The present application is entitled to and claims priority of U.S. Provisional Patent Application No. 62/112,996, filed on Feb. 6, 2015, entitled "Vented Draining Slack Adjuster End Cap" the disclosure of which is incorporated herein by reference in its entirety.

BACKGROUND OF THE INVENTION

Field of the Invention

The present disclosure is directed to a slack adjuster which automatically adjusts the slack in the brake rigging of a railway vehicle, and further, particularly, to a slack adjuster including a main spring housing end cap that also functions as an exit location for fluids and other contaminants that may enter the main spring housing of the slack adjuster, while preventing fluid and other contaminants from entering into the slack adjuster.

Description of Related Art

Slack adjuster assemblies have been employed in brake riggings to compensate for slack caused by wear induced in the brake pads, wheels, and other components in brake rigging during repeated braking applications. By controlling this slack, the brake piston travel is automatically maintained at the correct length to ensure maximum efficiency in the brake system. The slack adjuster is also used to automatically adjust the slack in the brake rigging for various other reasons. One reason is to maintain the brake cylinder piston rod travel distance within a prescribed limit, which is of particular importance in present day higher speed operations. In addition, today's railway vehicles have a greater number of cars due to better locomotive equipment. For these reasons, it is important that the piston rod travel of the brake cylinder be maintained at a relatively close tolerance in order to properly balance the fluid pressure, usually air, in the fluid cylinder with that in the reservoir. Another important reason is that the slack adjusters will provide a substantially more uniform braking force to be applied to each set of wheels on each car making up a train.

One example of a slack adjuster that is used in a wide variety of railway applications is a double-acting compression-type slack adjuster, which is described in U.S. Pat. No. 4,662,485 and incorporated herein by reference. This slack adjuster assembly includes an elongated hollow housing member restrained against rotation and pivotally connectable at a first end thereof to a brake rigging. An elongated rod member, which is restrained against rotation and pivotally connectable at a first end thereof to the brake rigging, is provided within this housing and has at least a threaded portion adjacent a second end thereof. The threaded portion of the rod member extends into and is reciprocally movable within the housing through a second end of the housing. A positioning means, such as a cone lock nut located within a cone nut housing portion, movable between respective first abutting engagement, disengagement, and second abutting engagement positions, is threadably engaged with the threaded portion of the rod member intermediate the ends thereof. The cone lock nut rotates about the threaded portion of the rod member when in the disengaged position, thereby changing the length of the slack adjuster assembly by changing the relative longitudinal position between the housing and the rod member. A pair of opposite facing abutment surfaces positioned within a portion of the housing and a pair of opposed abutting surfaces carried by the cone lock nut for engaging respective adjacent surfaces to resist rotation of the cone lock nut about the rod member when the cone lock nut is in one of the respective abutting engagement positions thereby retarding the change in relative longitudinal position between the housing and the rod member are provided. A first urging means is positioned between the cone lock nut and an abutment surface carried by the rod member for urging the cone lock nut into the disengaged position. A second urging means is positioned between the first end of the housing and the cone lock nut for overcoming a force applied by the first urging means and for urging the cone lock nut into the first abutting relationship position. An over travel control means located within an over travel control housing is positioned to reciprocally move in a longitudinal direction adjacent the first end of the housing and is engageable with the second urging means for reducing the force applied by the second urging means to less than the force applied by the first urging means, thereby allowing the cone lock nut to move to the disengaged position. An over travel control actuating means is positioned to engage the over travel control means for actuating the over travel control means in response to the travel distance of a brake cylinder piston connected to the brake rigging.

Other examples of slack adjusters include the Universal Model 2300-DJ, owned by the Assignee of the present disclosure, Ellcon National Model D-2000, and New York Air Brake Model KDR-482-E.

During use of the brake rigging, the slack adjuster is exposed to various environmental conditions, including conditions where the slack adjuster is exposed to large amounts of fluid, such as water. This water and other contaminants from the environment can accumulate and become trapped within the slack adjuster in the main spring housing or even in the critical operating area and near critical components of the slack adjuster, which can compromise the functioning of the slack adjuster. In one example, such as in the Universal Model 2300-DJ, the critical operating area includes the cone nut, bearing race assembly, and the conical spring, all of which operate together to allow the slack adjuster to adjust the brake rigging of the railcars as needed. It can be appreciated that different slack adjuster designs may include additional and/or other components within the critical operating area.

Some slack adjuster designs include a seal, such as a wiper seal, installed at the end cap of the main spring housing wherein the slack adjuster rod moves in and out. This seal is provided with the intended purpose of preventing fluid, such as water, and contaminants from entering into the slack adjuster. However, when a slack adjuster is exposed to large amounts of water, this wiper seal can fail to block all of the water from entering into the main spring housing, affecting spring performance and washing out operating grease and, subsequently, entering into the critical operating area of the slack adjuster. Thus, in these instances, water and contaminants may enter into the main spring housing and then into the critical operating area, deleteriously effecting the components located therein, resulting in faulty operation of the slack adjuster. Accordingly, there is a need in the art to provide an exit location for the water and contaminants that breach this wiper seal and enter into the main spring housing. There is also a need in the art to reduce and/or prevent the entrance of water and contaminants from entering into the main spring housing. Providing this exit location and preventing/reducing the amount of fluid and/or contaminants that enter into the main spring housing will maintain optimal operation of the spring in the main spring housing and the critical operating components of the slack adjuster by preventing accumulation of water and contaminants near the critical areas of the slack adjuster. The system for preventing this accumulation of water and protecting the critical operating area from contaminants must be adaptable to all slack adjusters and orientations of installation, such that the slack adjuster can be used in a wide array of environmental conditions.

SUMMARY OF THE INVENTION

In accordance with an aspect of the present disclosure, a vented end cap for a main spring housing of a slack adjuster is provided. The end cap includes an inner portion having an inner seal surface configured for cooperating with an elongated rod member of the slack adjuster and an outer seal surface configured for cooperating with a sidewall located at an end portion of the main spring housing. The end cap includes at least one opening configured to allow fluid and/or contaminants to drain therethrough.

According to one embodiment, the at least one opening can comprise a radially extending aperture in fluid communication with the inner portion and the outer seal surface. The radially extending aperture is positioned at a location to allow the fluid and/or contaminants to drain out of the inner portion of the end cap prior to breaching the inner seal. An aperture can be provided through the sidewall located at the end portion of the main spring housing. This aperture in the sidewall is in alignment with the radially extending aperture so as to permit the fluid and/or contaminants to drain out of the end cap and housing. The end cap can include multiple openings wherein each of the openings comprises a radially extending aperture associated therewith. The end cap can further comprise one or more longitudinally extending aperture in fluid communication with one or more of the radially extending apertures and with an interior of the main spring housing. These longitudinally extending apertures are capable of draining any fluid and/or contaminants that breach the sealing surfaces and become trapped within the main spring housing.

According to another embodiment, the at least one opening can comprise a cut-out portion in the outer seal surface.

According to yet another embodiment, the at least one opening can comprise a channel formed in the outer seal surface wherein the channel is defined by a first lip portion and a second lip portion. According to one design, the first lip portion has a first height and the second lip portion has a second height, and the first height is less than the second height. The end cap can be associated with the main spring housing such that the first lip portion faces in an outward direction with respect to the interior of the main spring housing, and the second lip portion faces the interior of the main spring housing. The at least one opening can further include one or more cut-out portions in the outer seal surface wherein the cut-out portions extend through the first and second lip portion in a direction that is perpendicular with respect to the channel.

The inner portion of the end cap can comprise an inner channel defined by a first ledge portion and a second ledge portion. The first ledge portion defines a first diameter and the second ledge portion defines a second diameter, and the inner seal is designed such that the first diameter is greater than the second diameter. The inner channel can define a third diameter that is greater than the first and second diameters. The inner channel has a size which accommodates a rod seal or wiper seal.

The end cap outer seal can be a channel defined by the first lip portion and the second lip portion that are integrally formed with the end cap. The second lip portion can include an angled surface extending in an outward direction with respect to the channel.

The opening in the end cap is configured to drain fluid and contaminants that become trapped in the end cap or the main spring housing.

In accordance with another aspect of the present disclosure a drainage system for use with a slack adjuster for a railway brake rigging system is provided. The slack adjuster includes at least a main spring housing and a cone nut housing enclosing a critical operating area of the slack adjuster. The critical operating area includes components configured to operate together to adjust the brake rigging. The drainage system includes an end cap having an inner portion having an inner seal surface configured for cooperating with an elongated rod member and an outer seal surface configured for cooperating with a sidewall located at an end portion of the main spring housing. The end cap includes at least one opening configured to allow fluid and/or contaminants to drain therethrough and out of the slack adjuster to reduce exposure of components within the main spring housing and exposure of the critical operating area of the slack adjuster to the fluid and/or contaminants. Longitudinally extending apertures can be provided in fluid communication with the radially extending apertures and an interior of the main spring housing to drain fluid and/or contaminants out of the main spring housing.

According to one embodiment, the at least one opening can comprise a radially extending aperture in fluid communication with the inner portion and the outer seal surface, and the system can further include an aperture extending through the sidewall located at the end portion of the main spring housing in alignment with the radially extending aperture through the end cap. This radially extending aperture can be positioned at a location to allow the fluid and/or contaminants to drain out of the inner portion of the end cap and the housing sidewall prior to breaching the inner seal.

According to another embodiment, the at least one opening can comprise a channel formed in the outer seal surface. The channel can be defined by a first lip portion having a first height and a second lip portion having a second height, wherein the first height is less than the second height. The end cap can be associated with the main spring housing such that the first lip portion faces in an outward direction with respect to the interior of the main spring housing and the second lip portion faces the interior of the main spring housing. The at least one opening can further include a cut-out portion in the outer seal surface wherein the cut-out portion extends through the first and second lip portions in a direction that is perpendicular with respect to the channel.

The inner portion of the end cap can comprise an inner channel defined by a first ledge portion having a first diameter and a second ledge portion having a second diameter and wherein the first diameter is greater than the second diameter. The channel can define a third diameter that is greater than the first and second diameters.

In accordance with yet another aspect of the present disclosure, a method is provided for preventing the accumulation of fluid and/or contaminants within a slack adjuster and for protecting a critical operating area of the slack adjuster. The slack adjuster includes a main housing having an end cap and a cone nut housing enclosing the critical operating area of the slack adjuster. The method comprises providing at least one opening in the end cap configured to allow fluid to drain out of the end cap and main housing portion to reduce exposure of components within the main spring housing and exposure of the critical operating area of the slack adjuster to the fluid and/or contaminants.

The end cap can comprise an inner portion having an inner seal surface configured for cooperating with an elongated rod member and an outer seal surface configured for cooperating with a sidewall located at an end portion of the main spring housing. The at least one opening can comprise at least one of a radially extending aperture in fluid communication with the inner portion and the outer seal surface, at least one cut-out portion in the outer seal surface, and a channel in the outer seal surface defined by a first lip portion and a second lip portion.

In accordance with another aspect of the present disclosure, a double-acting tension actuatable slack adjuster to adjust the slack in a railway vehicle brake linkage is provided. The slack adjuster comprises an elongated hollow cylindrical housing member which is restrained against rotation and pivotally connectable at a first end thereof. The elongated hollow cylindrical housing includes a main spring housing having an end cap at an end of thereof, a cone nut housing, and an over travel housing. An elongated rod member extends through the end cap. The rod member is restrained against rotation and pivotally connectable at a first end thereof. The rod member has at least a portion thereof threaded, and the threaded portion extends into the housing member through a second end of the housing member. A cone lock nut is threadedly engaged with the threaded portion of the rod member intermediate a first and second end thereof. The cone lock nut is axially movable for rotating about the threaded portion of the rod member to change the length of the slack adjuster by changing the relative longitudinal position between the housing member and the rod member. The cone lock nut is located within the cone nut housing. At least a first spring is provided for urging the cone lock nut into a first position with respect to the housing member. A second spring is provided for overcoming a force applied by the first spring and for urging the cone lock nut into a second position. The slack adjuster also comprises at least one drainage system for allowing fluid and/or contaminants to drain out of the slack adjuster wherein the at least one drainage system is associated with the end cap of the main housing.

The end cap can comprise an inner portion having an inner seal surface configured for cooperating with the elongated rod member and an outer seal surface configured for cooperating with a sidewall located at an end portion of the main spring housing. The at least one opening can comprise at least one of a radially extending aperture in fluid communication with the inner portion and the outer seal surface, at least one cut-out portion in the outer seal surface, and/or a channel in the outer seal surface defined by a first lip portion and a second lip portion. The slack adjuster can also include various seals and/or drainage locations along the body of the slack adjuster. According to one embodiment, at least one opening can be provided in the over travel housing portion. According to another embodiment, at least one opening can be provided in the main spring housing. These openings are configured to allow fluid and/or contaminants to drain there through, thus reducing exposure of the critical operating area of the slack adjuster to the fluid and/or contaminants. At least one of a plug, one-way valve, and/or a patch can be provided to cover or seal the at least one opening in the over travel housing portion and/or the main spring housing. According to one embodiment, a single patch can be provided for covering multiple openings in the over travel housing portion and/or the main spring housing, leaving a single or a few of the openings uncovered. In this embodiment, the user can then install the slack adjuster such that the uncovered opening or openings are facing in a downward direction to allow fluid or contaminants to drain there through and out of the slack adjuster.

According to yet another embodiment and/or in addition to the openings described above, the slack adjuster can include one or more seals or sealing systems configured for cooperating with at least one of the main housing portion, cone nut housing portion, and over travel housing portion to seal the critical operating area against entrance of fluid and/or contaminants therein or to reduce exposure of the critical operating area to fluid and/or contaminants. It can be appreciated that any of the sealing systems or drainage systems described above can be used alone or cumulatively in any combination along with the vented end cap to achieve the necessary sealing and/or drainage of the slack adjuster assembly so as to protect the critical operating area from fluid and/or contaminants.

BRIEF DESCRIPTION OF THE DRAWINGS

FIG. 4A is a perspective view of a main spring housing including the vented end cap in accordance with an embodiment of the present disclosure;

FIG. 4B is an enlarged cross-sectional view of the main spring housing and vented end cap of FIG. 4A in accordance with an embodiment of the present disclosure;

FIG. 6A is a perspective view of a main spring housing including the vented end cap in accordance with another embodiment of the present disclosure;

FIG. 6B is an enlarged cross-sectional view of the main spring housing and vented end cap of FIG. 6A in accordance with an embodiment of the present disclosure;

FIG. 11 is a top view of the patch used for covering the apertures in the main spring housing and/or the over travel housing in FIGS. 9 and 10 in accordance with an embodiment of the present disclosure.

DESCRIPTION OF THE INVENTION

Figure 1:
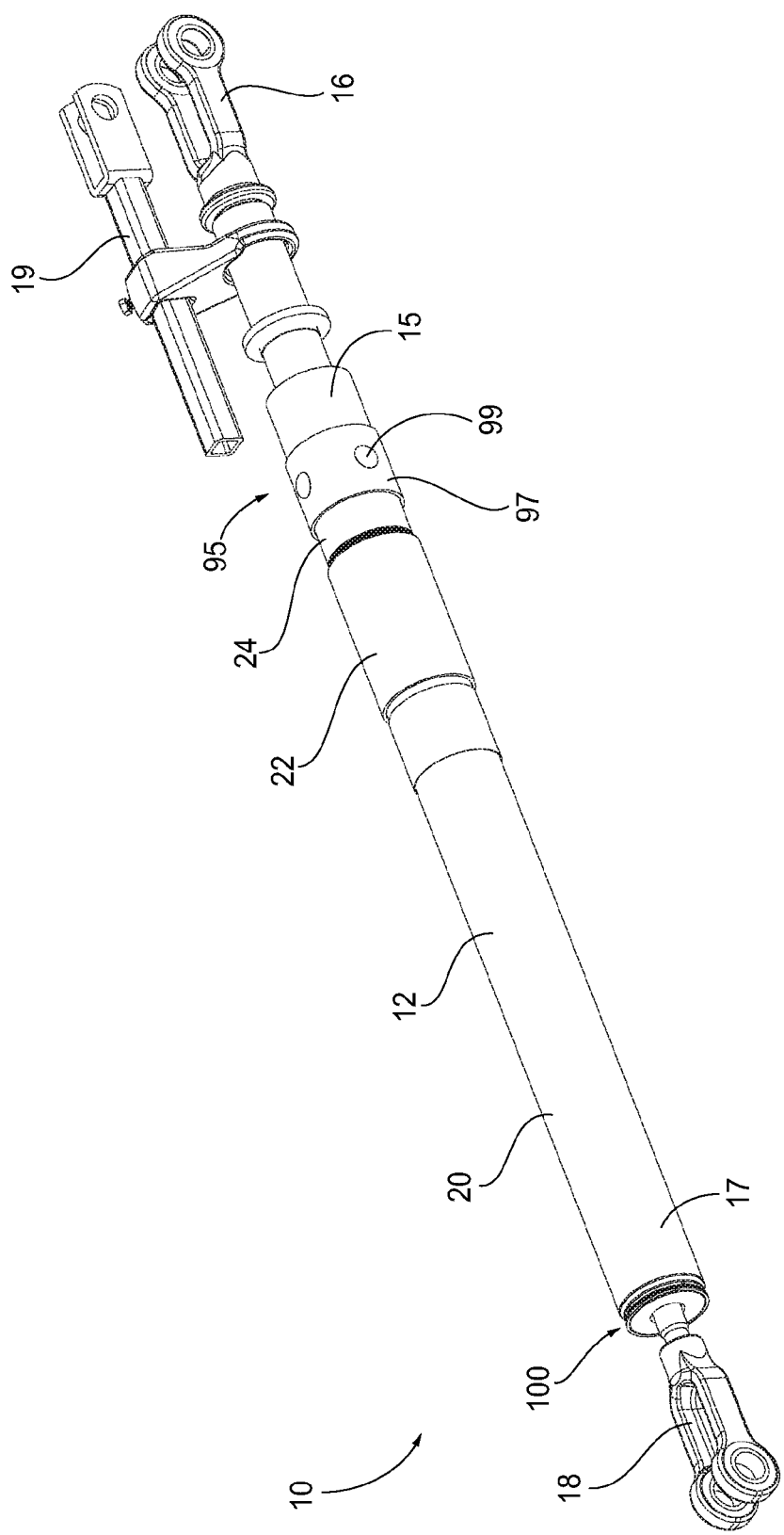
FIG. 1 is a perspective view of a double acting automatic slack adjuster for use with a railway brake rigging including a vented end cap for drainage in accordance with an embodiment of the present disclosure.

For purposes of the description hereinafter, the terms "upper", "lower", "right", "left", "vertical", "horizontal", "top", "bottom", "lateral", "longitudinal", and derivatives thereof, shall relate to the disclosure as it is oriented in the drawing figures. However, it is to be understood that the disclosure may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

Figure 1A:
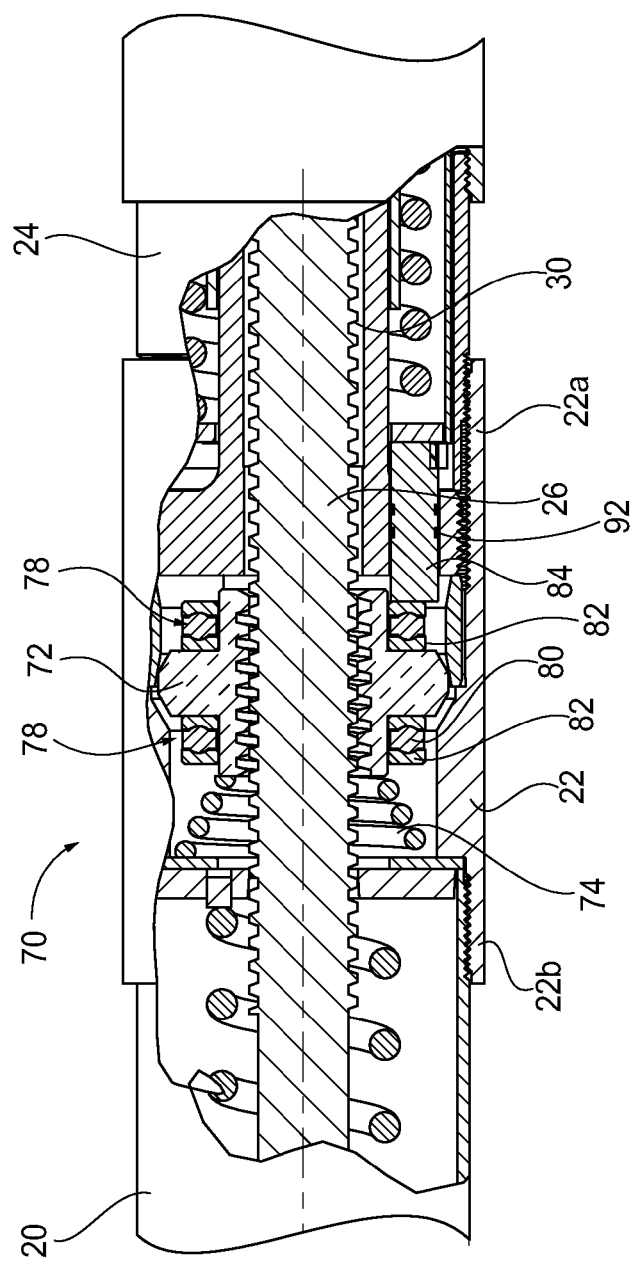
FIG. 1A is a partial cross-sectional view of the slack adjuster of FIG. 1, showing a critical operating area of the slack adjuster in accordance with an embodiment of the present disclosure.
Figure 2:
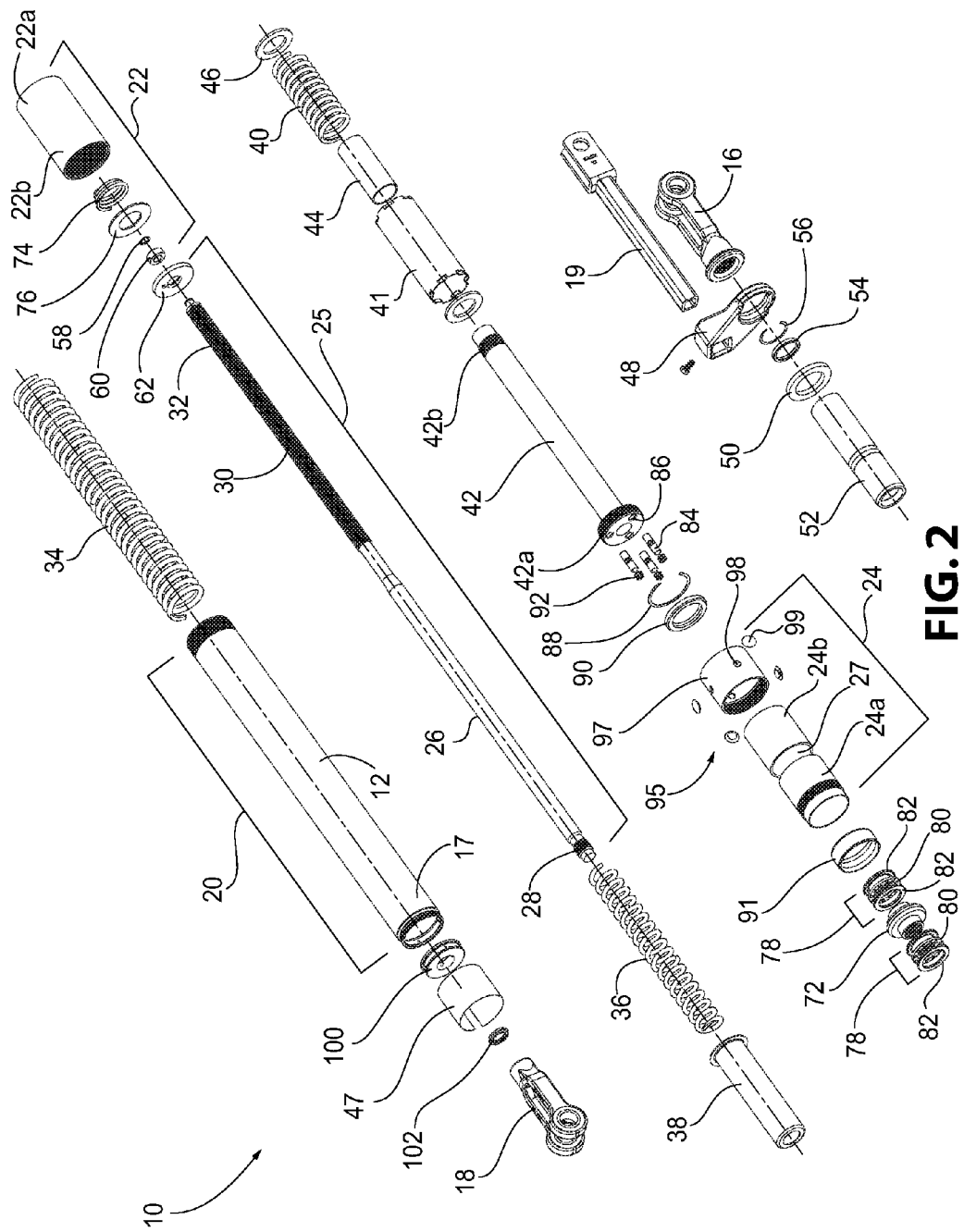
FIG. 2 is an expanded perspective view of the slack adjuster of FIG. 1, including the vented end cap in accordance with an embodiment of the present disclosure.
Figure 3:
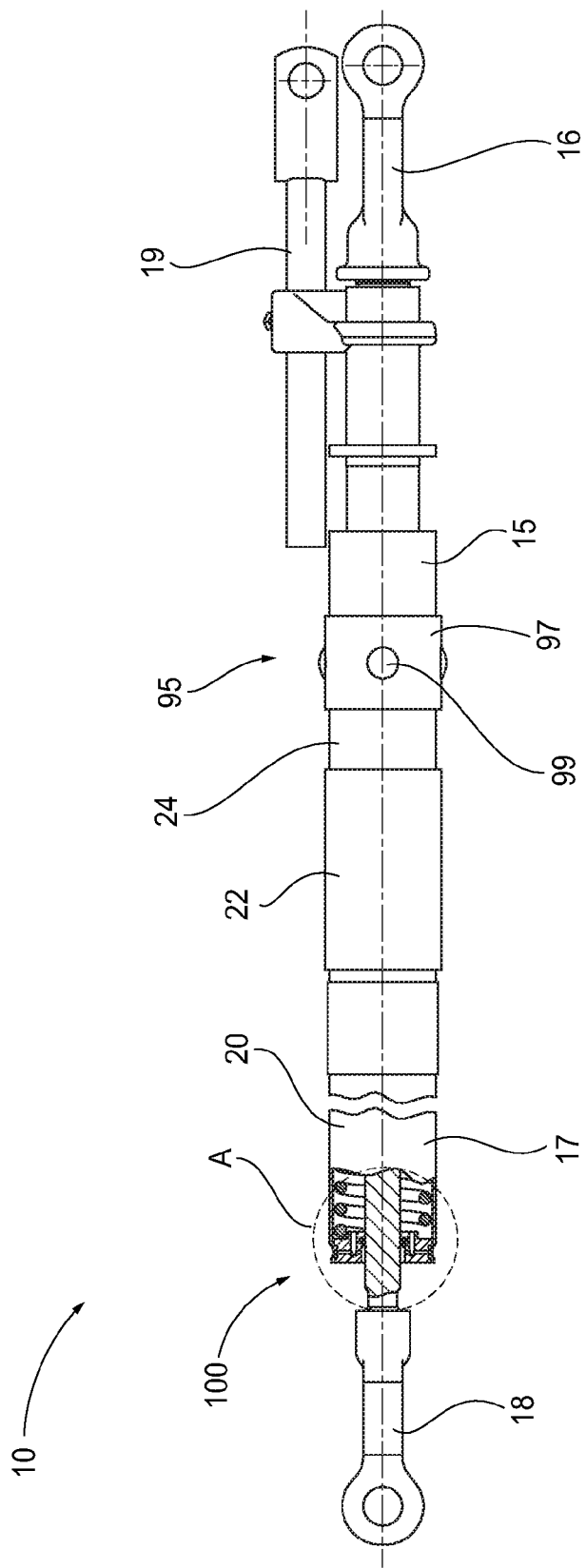
FIG. 3 is a side elevation view of the double acting automatic slack adjuster of FIG. 1, including a partial cross-sectional view showing the vented end cap in accordance with an embodiment of the present disclosure.
Figure 3B:
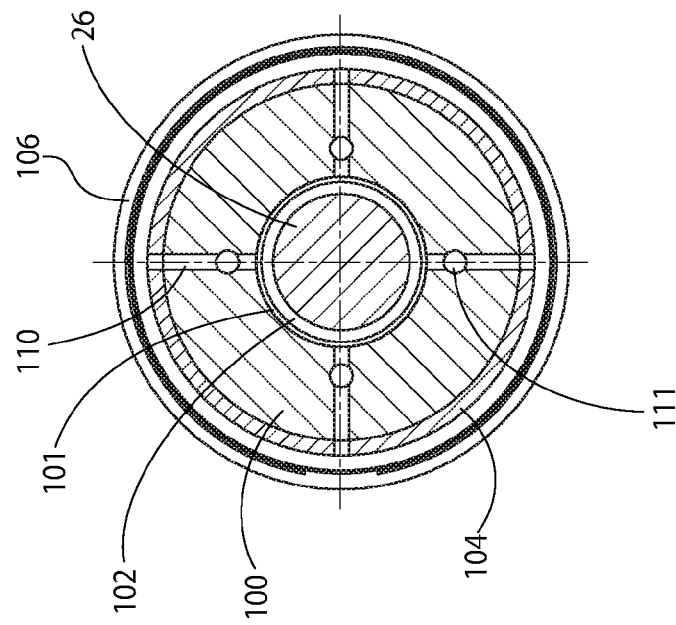
FIG. 3B is a cross-sectional view of the vented end cap taken along line B-B of FIG. 3A in accordance with an embodiment of the present disclosure.
Figure 3A:
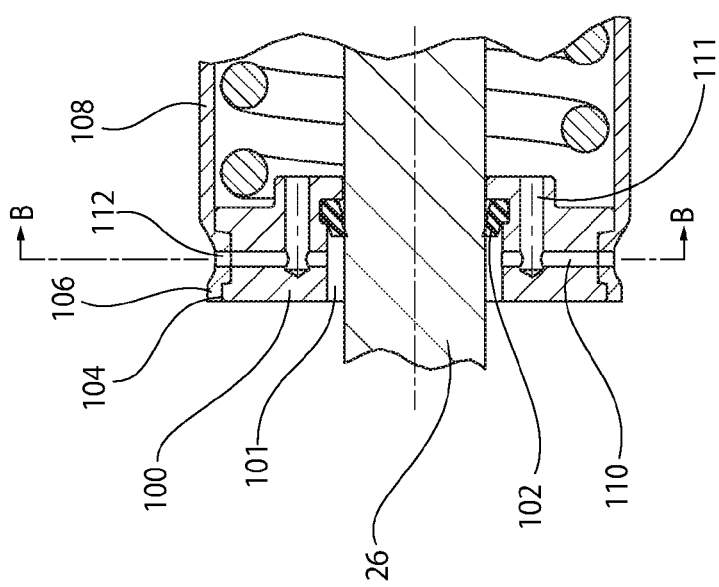
FIG. 3A is a detail view "A" of the vented end cap of FIG. 3 in accordance with an embodiment of the present disclosure.

Reference is now made to FIGS. 1-3 which show a double acting slack adjuster, generally indicated as 10, for use in a railway vehicle brake linkage, not shown, to automatically adjust the slack within the brake linkage caused by wear induced in the brake pads, wheels, and other components in the brake rigging during repeated braking applications. The slack adjuster includes a vented end cap 100, configured to function as an exit location for fluids and other contaminants that may enter the main spring housing 20 of the slack adjuster 10 and to reduce or eliminate fluid and other contaminants from entering into the slack adjuster 10 which ultimately reduces exposure of the critical operating area, generally indicated as 70 in FIG. 1A, to fluid and/or contaminants. The slack adjuster critical operating area 70 is defined in detail below, but generally refers to the area including the components which operate together to adjust the brake rigging of the railcars as needed.

With continuing reference to FIGS. 1-3, the slack adjuster 10 includes an elongated hollow cylindrical housing member 12 which is restrained against rotation. The slack adjuster 10 is pivotally connectable at a first end, generally indicated as 15 thereof, to the brake rigging with a front jaw 16 and pivotally connectable at a second end, generally indicated as 17 thereof, to the brake rigging with a rear jaw 18. The second end 17 of the housing member 12 includes the vented end cap 100, in accordance with the present disclosure, and a wiper seal 102. The first end 15 of the slack adjuster 10 also includes a control rod 19. The elongated cylindrical housing member 12 includes the main spring housing 20, a cone nut housing portion 22, and an over travel housing portion 24. With particular reference to FIG. 2, the slack adjuster 10 also includes a rod assembly 25 including an elongated rod member 26 positioned for reciprocal movement within the housing member 12 through the second end 17 of the housing member 12, which is also one end or the rear end of the main spring housing 20. The rod member 26 is restrained against rotation and pivotally connectable at a first end 28 thereof to the railway brake rigging by the rear jaw 18. The rod member 26 has a threaded portion 30 adjacent a second end 32 that extends into the housing member 12 and through the first end 15 of the housing member 12. The main spring housing 20 and/or the elongated cylindrical housing member 12 can also include a decal or identification label 47, as shown in FIG. 2.

With continuing reference to FIGS. 1-3, and with reference to FIG. 1A, the slack adjuster 10 includes the critical operating area 70. This critical operating area 70 includes the components of the slack adjuster 10 which operate together to adjust the brake rigging. One example of a critical operating area is shown in FIG. 1A and includes a positioning member, such as a cone lock nut 72 that is located within the cone nut housing portion 22, and threadedly engaged with the threaded portion 30 of the elongated rod member 26. The cone lock nut 72 rotates about the threaded portion 30 of the elongated rod member 26 between respective first abutting engagement, disengagement, and second abutting engagement positions to change the length of the slack adjuster 10 by changing the relative longitudinal positions between the housing member 12 and the elongated rod member 26.

The slack adjuster 10 also includes a first urging assembly which can include at least one main or first spring 34, an additional spring 36 located within a spring cup 38, and a conical spring 74, located within the critical operating area 70 for urging the cone lock nut 72 into a first position, such as a disengaged position, with respect to the housing member 12. The conical spring 74 can be caged between the cone lock nut 72 and a conical spring seat 76. It can be appreciated that the springs 34, 36 can be replaced with other types of urging members, such as pneumatic or hydraulic cylinders.

A second urging assembly is also provided which, according to one embodiment, can include a second spring or over travel spring 40 located within an over travel spring housing 41. The over travel spring 40 is stronger than the first or main spring 34 so as to overcome the force applied by the first or main spring 34 and, therefore, urge the cone lock nut 72 into a second position. It can also be appreciated that, like the first urging assembly, a fluid operated cylinder may be used in place of the over travel spring 40.

The over travel housing portion 24 can also include a rod guide 42 threaded at a first end 42a and a second end 42b and configured for cooperating with the elongated rod member 26 and over travel spring 40. An over travel sleeve 44 can be provided between at least a portion of the rod guide 42 and the over travel spring 40. One or more washers 46 can be provided within the over travel housing portion 24.

Other components located at the front end of the slack adjuster 10 include an over travel sliding collar 48, an over travel control ring swaging 50, and a machined tube 52. A wiper seal 54 and a retaining ring 56 may also be provided at this front end. A wiper seal 90 may also be provided in the over travel housing assembly 24. As discussed above, the wiper seal 102 is provided at the rear end or the back entrance near the vented end cap 100 of the main spring housing 20. Prior to the present disclosure, previous slack adjuster designs relied upon these wiper seals to prevent water and contaminants from entering into the slack adjuster 10 and into the critical operating area 70. However, in situations where the slack adjuster is exposed to a large amount of water, these wiper seals may be insufficient to prevent the entrance of water and/or contaminants from entering into the critical operating area 70 of the slack adjuster 10 and causing operational problems with the components located therein which operate together to adjust the brake rigging of the railcar. These operational problems could occur if dirt or other foreign objects become trapped between the moving parts of the components or if any accumulated water surrounding the components freezes, which would inhibit and/or otherwise prevent the normal movement of the components with respect to one another.

Referring, in particular, to FIGS. 1A and 2, in addition to the cone lock nut 72, conical spring 74, and conical spring seat 76, the critical operating area 70 includes bearing assemblies, generally indicated as 78, including a bearing 80 cooperating with races 82, which are located on both sides of the cone lock nut 72. Also included in the critical operating area 70 are one or more trigger pins 84 located within apertures 86 extending into the first end 42a of the rod guide 42. One or more O-rings 92 may be associated with the trigger pins 84 to assist in preventing fluid and/or contaminants from entering into the cone nut housing portion 22 through the aperture 86 in the rod guide 42. The critical operating area 70 can also include a retaining ring 88, the over travel housing portion seal or wiper seal 90, and a front cone 91.

In operation, the cone lock nut 72, the bearing assemblies 78, and the conical spring 74 cooperate together to change a length of the slack adjuster 10 by changing a relative longitudinal position between the main spring housing 20 and the elongated rod 26 located within the main spring housing 20. The cone nut housing portion 22 is positioned between the over travel housing portion 24 and the main spring housing 20. As shown in FIG. 1A, the cone nut housing portion 22 includes a first end 22a positioned adjacent to the over travel housing portion 24 and a second end 22b positioned adjacent to the main spring housing 20. As shown in FIG. 2, the cone nut housing portion 22 can include a retaining ring 58, a collet 60, and a washer 62. The first end 22a and the second end 22b can also include threads that are configured to cooperate with threads on the main spring housing 20 and the over travel housing portion 24.

Referring now to FIGS. 3A-3B, 4A-4C, and 5A-5D, the present disclosure is directed to vented end cap 100 for the main spring housing 20 of the slack adjuster 10. The end cap 100 includes an inner portion 101 having an inner seal surface comprising the wiper seal 102, also shown in FIG. 2, configured for cooperating with the elongated rod member 26 of the slack adjuster 10 and an outer seal surface 104 configured for cooperating with a sidewall 106 located at an end portion 108 of the main spring housing 20 and/or the end portion 17 of the elongated cylindrical housing 12 of the slack adjuster 10. The end cap 100 includes at least one opening 110 configured to allow fluid and/or contaminants to drain therethrough.

According to one embodiment, the at least one opening 110 can comprise a radially extending aperture in fluid communication with the inner portion 101 and the outer seal surface 104. The radially extending aperture 110 is positioned at a location to allow the fluid and/or contaminants to drain out of the inner portion 101 of the end cap 100 prior to breaching the inner wiper seal 102. An aperture 112 can be provided through the sidewall 106 located at the end portion 108 of the main spring housing 20. This aperture 112 in the sidewall 106 is in alignment with the radially extending aperture 110 so as to permit the fluid and/or contaminants to drain out of the end cap 100 and housing 20. The end cap 100 can include multiple openings 110 wherein each of the openings 110 comprises a radially extending aperture associated therewith. Longitudinally extending apertures 111 can be provided which communicate with the main spring housing 20 and the radially extending apertures 110 to allow for draining of any fluid and/or contaminants within the main spring housing 20 that breach the sealing surfaces.

Figure 5B:
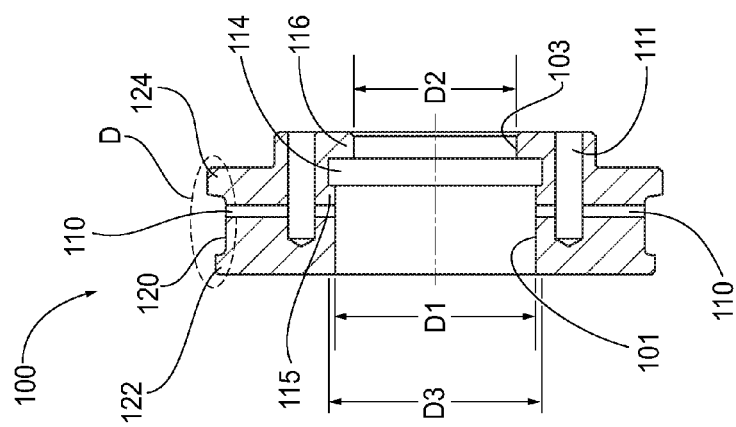
FIG. 5B is an enlarged cross-sectional view of the vented end cap of FIG. 5A in accordance with an embodiment of the present disclosure.
Figure 5A:
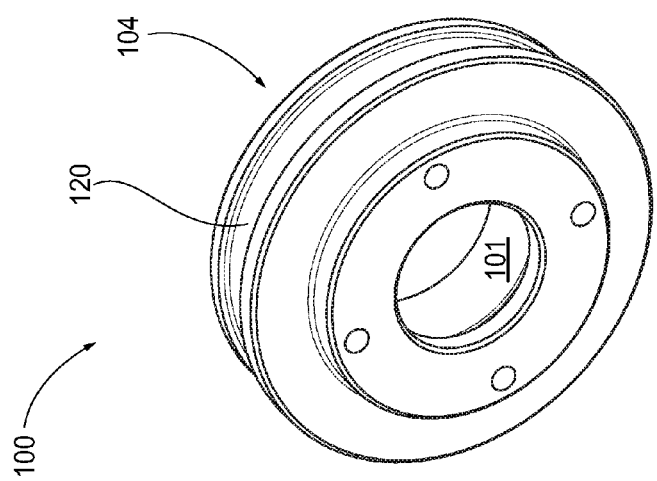
FIG. 5A is a perspective view of a vented end cap of FIGS. 4A and 4B in accordance with an embodiment of the present disclosure.
Figure 5D:
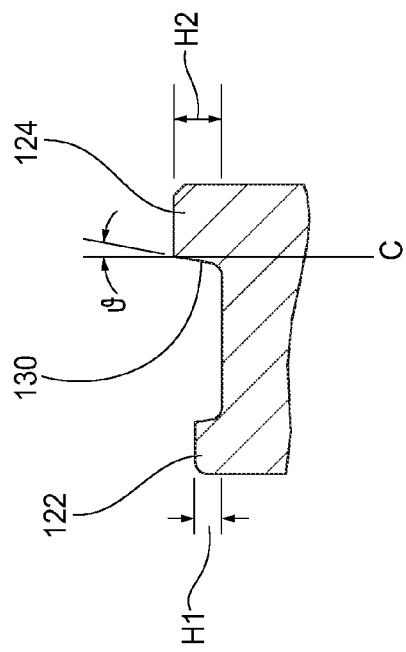
FIG. 5D is a detailed view "D" of a portion of the vented end cap of FIG. 5B.
Figure 5C:
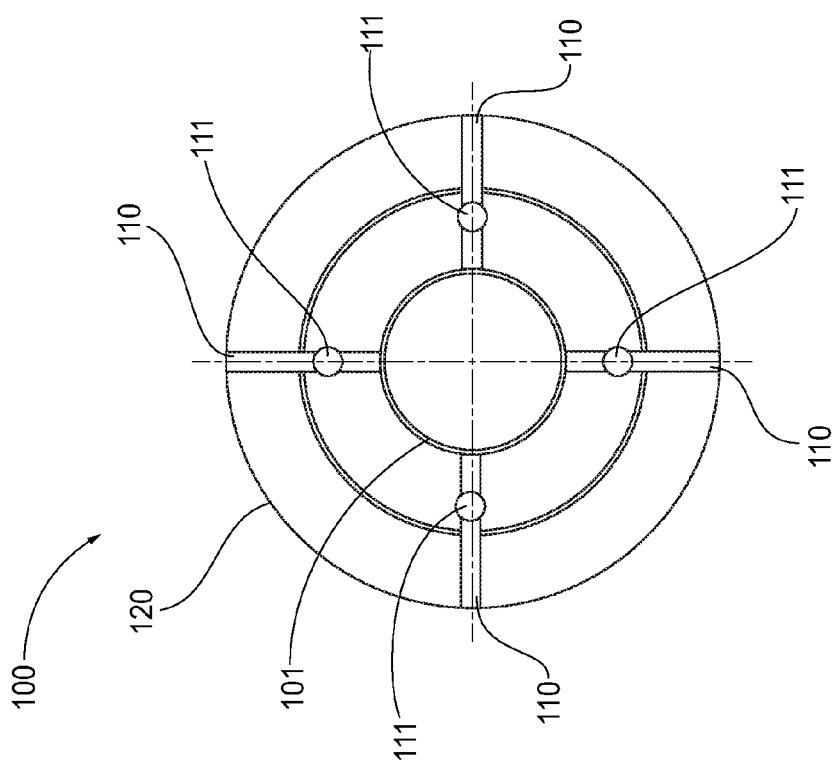
FIG. 5C is an end view of the vented end cap of FIG. 5A in accordance with an embodiment of the present disclosure.
Figure 6C:
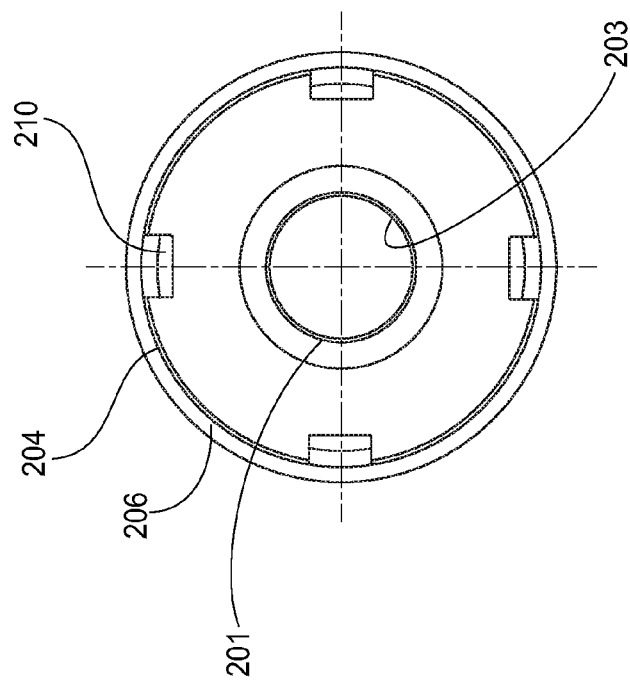
FIG. 6C is an end view of the main spring housing and vented end cap of FIG. 6A in accordance with an embodiment of the present disclosure.

With continuing reference to FIGS. 5A-5D, the vented end cap 100 further comprises a channel 120 formed in an outer seal surface 104. The channel 120 is defined by a first lip portion 122 and a second lip portion 124. As shown in FIG. 5D, the first lip portion 122 has a first height H1 and the second lip portion 124 has a second height H2 and the first height H1 is less than the second height H2. The end cap 100 can be associated with the main spring housing 20 such that the first lip portion 122 faces in an outward direction with respect to the interior 21 of the main spring housing 20 and the second lip portion 124 faces the interior 21 of the main spring housing 20. The outer seal surface 104 cooperates with an inner surface of the sidewall 106 of the end portion 108 of the housing to form a seal therewith to prevent or reduce the amount of fluid and/or contaminants that enter into the housing portion 20. The vented end cap 100 can include both the radially extending apertures 110 and the longitudinally extending apertures 111 discussed in detail above.

As shown in FIG. 5D, the second lip portion 124 can include an angled surface 130. According to one embodiment, this angled surface 130 can have an angle $\partial$ of approximately 10° with respect to a centerline C extending through the second lip portion 124. This angled surface 130 allows for proper forming of the main spring housing 20 around the end cap 100 and ensure the sealing of the surface in this area.

The end cap 100 can be secured to the end portion 108 of the main spring housing 20 by any well-known technique, such as by crimping or by swaging. Essentially the main spring housing 20 is squeezed around the end cap 100 forming it into place in the channel 120 that runs around the exterior of the cap 100.

As shown in FIG. 5B, an inner portion 101 of the end cap 100 can comprise an inner channel 114 defined by a first ledge portion 115 and a second ledge portion 116. The first ledge portion 115 defines a first diameter D1 and the second ledge portion 116 defines a second diameter D2. The first diameter D1 is greater than the second diameter D2 and an inner seal surface 103, which cooperates with the rod member 26, is defined by second ledge portion 116 having the second diameter D2. The inner channel 114 can define a third diameter D3 that is greater than the first diameter D1 and the second diameter D2. The inner channel 114 is configured to receive the rod seal or wiper seal 102, as discussed above and shown in FIG. 3A, and first ledge portion 115 is sized to have a diameter and shape configured to hold a retaining ring to keep the seal 102 in place.

The particular shape of the outer seal 104 of the end cap 100 and the shape of the inner portion 101, along with axially extending apertures 110 and longitudinally extending apertures 111, are configured to drain fluid and contaminants that become trapped in the end cap 100 or the main spring housing 20 and also is such that it reduces or prevents entrance of fluids and/or contaminants into the main spring housing 20.

Reference is now made to FIGS. 6A-6C and 7A-7C, which show an end cap 200 according to another embodiment of the present disclosure. In this design, the end cap 200 includes at least one or more openings 210 in the form of a cut-out portion in an outer seal surface 204. An outer channel 220 can be formed in the outer seal surface 204. The outer channel 220 is defined by a first lip portion 222 and a second lip portion 224. The first lip portion 222 has a first height H1 and the second lip portion 224 has a second height H2. The first height H1 is less than the second height H2. The end cap 200 can be associated with the main spring housing 20 such that the first lip 222 portion faces in an outward direction with respect to the interior 21 of the main spring housing 20 and the second lip portion 224 faces an interior 21 of the main spring housing 20.

The end cap 200 is a one-piece member that is machined to form the different dimensions including the outer seal surface 204 which is machined to have a shape and finish 205. The outer seal surface 204 and machined finish 205 is capable of forming a seal with an inner surface 207 of the sidewall 206 at an end portion 208 of the main spring housing 20. This outer seal 204 is configured to form a friction fit with the sidewall 206 of the main spring housing to secure the cap 200 in the main spring housing 20 and secured thereto by any well-known technique, such a swaging or crimping, as discussed above.

Figure 7B:
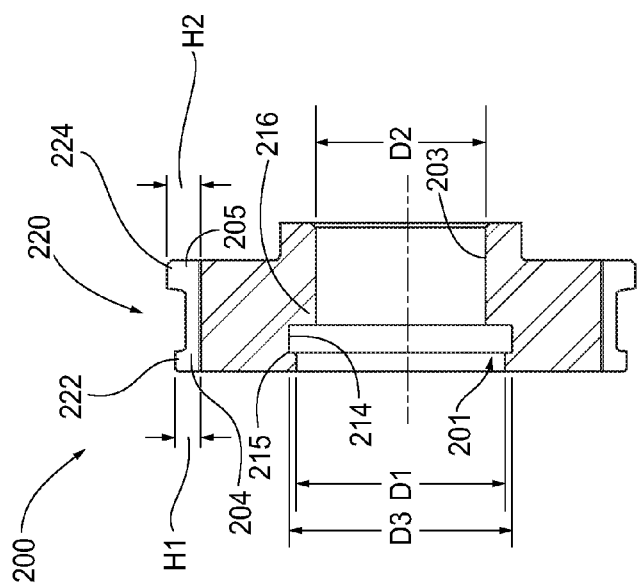
FIG. 7B is an enlarged cross-sectional view of the vented end cap of FIG. 7A in accordance with an embodiment of the present disclosure.
Figure 7A:
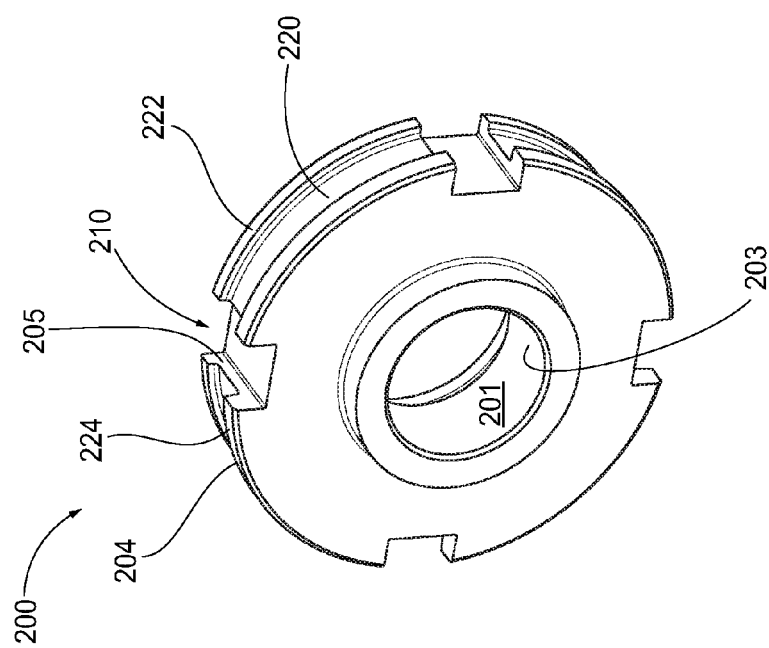
FIG. 7A is a perspective view of the vented end cap of FIGS. 6A-6C in accordance with an embodiment of the present disclosure.
Figure 7C:
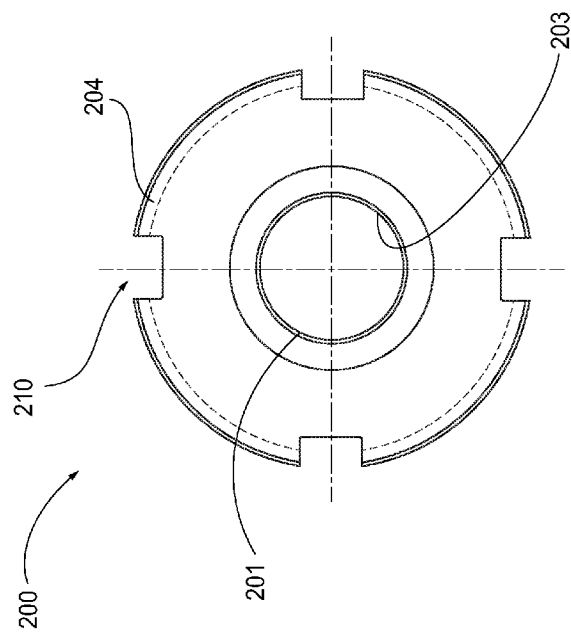
FIG. 7C is an end view of the vented end cap of FIG. 7A in accordance with an embodiment of the present disclosure.

As shown in FIGS. 7A and 7B, the inner portion 201 of the end cap 200 can comprise an inner channel 214 defined by a first ledge portion 215 and a second ledge portion 216. The first ledge portion 215 defines a first diameter D1 and the second ledge portion 216 defines a second diameter D2. The first diameter D1 is greater than the second diameter D2 and an inner seal surface 203, which cooperates with the rod member 26, is defined by second ledge portion 216 having the second diameter D2. The inner channel 214 can define a third diameter D3 that is greater than the first diameter D1 and the second diameter D2. A rod seal or wiper seal, such as 102, shown in FIG. 3A, can be press-fitted into inner channel 214 and retained therein. First ledge portion 215 and first diameter D1 are configured to allow for clearance of the seal and to hold a retaining ring to keep the seal in place.

The particular design of the outer seal surface 204 and the inner portion 201 of the end cap 200 assists in the prevention of fluid and/or contaminants from entering into the main spring housing 20, and the openings or cutout portions 210 in the outer seal surface provide an exit point for any fluids and/or contaminants that breach the inner seal or inner seal surface 203 or outer seal surface 204, or enter in via any other location, and become trapped in the main spring housing 20.

With continuing reference to FIGS. 1-3, in addition to the vented end caps 100 and 200, described above, the slack adjuster 10 can also include a drainage system, generally indicated as 95, associated with the over travel housing portion 24 to enable any fluid and/or contaminants that become trapped in the slack adjuster 10 to exit therefrom. The drainage system 95 includes at least one opening 27 extending through a sidewall portion of the over travel housing portion 24. According to one embodiment, the opening can be formed by providing two separate portions 24a, 24b of the over travel housing portion 24 and associating these portions 24a, 24b with one another via the plug housing 97, as described below such that opening 27 extends there between. The opening 27 is configured to form a direct egress for the fluid and/or contaminants to drain therethrough and to reduce exposure of the critical operating area 70 to fluid and/or contaminants. According to another embodiment, the opening 27 can comprise one or more apertures formed through a sidewall portion of the over travel housing portion 24.

As discussed above, the plug housing 97 can encompass at least a portion of the over travel housing portion 24. The plug housing 97 includes at least one aperture 98, or a plurality of apertures 98, extending through a sidewall portion in alignment with the opening 27 or apertures extending through the over travel housing portion 24. The plug housing 97 can threadedly engage the over travel housing portion 24. A removable plug 99 can be provided to close the aligned openings or apertures. The plug 99 can be in the form of a one-way valve, a patch, or a sealant material. After installation, the downwardly most directed plug 99 can be removed to allow for drainage of fluid and contaminants out of the slack adjuster 10 and away from the critical operating area 70 of the slack adjuster 10.

Figure 8:
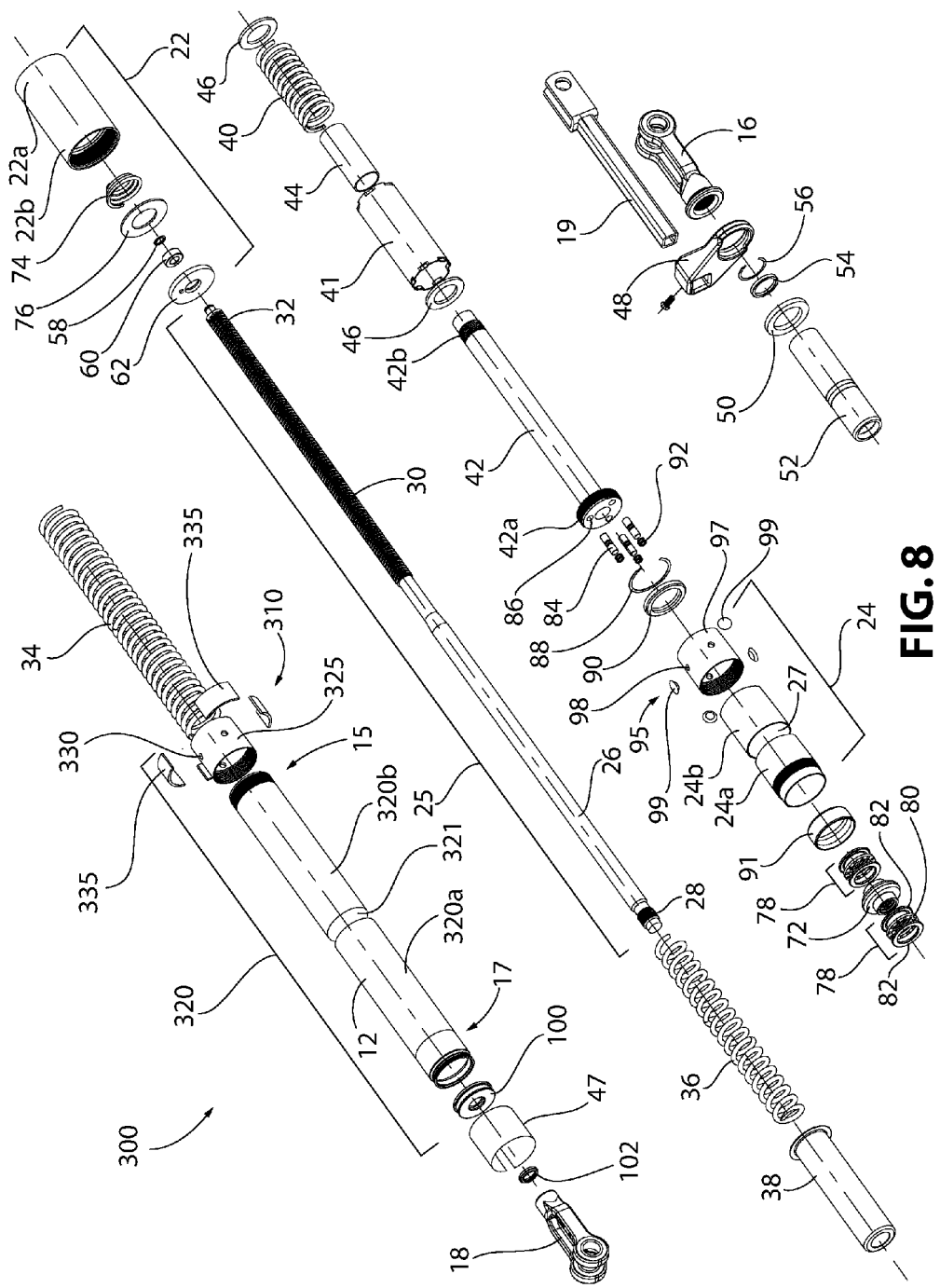
FIG. 8 is an expanded perspective view of a double acting automatic slack adjuster for use with a railway brake rigging including a vented end cap and a drainage system in accordance with an embodiment of the present disclosure.

Reference is now made to FIG. 8, which shows a double-acting slack adjuster, generally indicated as 300, including a drainage system, in accordance with another embodiment of the present disclosure. The slack adjuster includes a drainage system, generally indicated as 310, configured to allow fluid and/or contaminates to drain out of the main spring housing 320 of the slack adjuster 300 to reduce exposure of the critical operating area 70, as shown in detail in FIG. 1A, to fluid and/or contaminants With continuing reference to FIG. 8, the slack adjuster 300 is similar to the slack adjuster discussed in detail above with regard to FIGS. 1-3, where like reference numerals denote like components. The slack adjuster 300 includes the elongated hollow cylindrical housing member 12 having a first end 15 and a second end 17. The second end 17 of the housing member 12 includes the cap 100 and the wiper seal 102, as discussed in detail above. The first end 15 of the housing member 12 also includes the control rod 19. The elongated cylindrical housing member 12 includes the main spring housing portion 320, the cone nut housing portion 22, and the over travel housing portion 24. The slack adjuster 300 also includes the rod assembly 25 including an elongated rod member 26 positioned for reciprocal movement within the housing member 12 through the second end 17 of the housing member 12. The rod member 26 is restrained against rotation and pivotally connectable at a first end thereof to the railway brake rigging by the rear jaw 18. The rod member has a threaded portion 30 adjacent a second end 32 that extends into the housing member 12 and through the first end 15 of the housing member 12.

In addition to the vented end cap 100, 200 and the drainage system 95, in the over travel housing portion 24, the slack adjuster can include another drainage system 310 which is associated with the main spring housing portion 320. The drainage system 310 allows fluid, such as water, and other contaminants and/or debris, which pools/accumulates or follows the path of least resistance into the main spring housing 320, to drain out of the slack adjuster 300 to prevent this fluid and/or contaminants from contacting the critical operating area 70 of the slack adjuster 300.

The drainage system 310 includes a plug housing 325 which is fitted about the main spring housing 320. The plug housing 325 can have threads located at opposing ends thereof. The main spring housing 320 can be split into two separate members 320a, 320b which are associated with one another by the plug housing 325 so as to provide an opening or gap 321 located therebetween. According to one embodiment, threads can be provided on the facing end portions of separate members 320a, 320b of the main spring housing 320 which can be threadedly secured to the threads of the plug housing 325. It can be appreciated that the drainage system 310 of the present disclosure can be used with new slack adjuster systems or can be retrofitted to existing slack adjuster systems by modification of the main spring housing 320. According to another embodiment, the main spring housing 320 can be modified to be a one-piece member including one or more openings therein which can be used with or without the plug housing 325.

The plug housing 325 can include at least one aperture 330 extending through a sidewall portion thereof. The aperture 330 is configured to form a direct egress for the fluid and/or contaminates to drain through opening 321 of the main spring housing 320 and out of the main spring housing 320 and the slack adjuster 300 to reduce and/or to prevent the fluid and/or contaminants from entering into the critical operating area 70 of the slack adjuster. Multiple apertures 330 can be located about and extending through the sidewall portion of the plug housing 325. As stated above, the main spring housing 320 can be a one-piece member and the drainage apertures 330 can extend through the sidewall of the housing 320 itself with or without the housing.

A patch 335 or a plug, such as the plug 99, can be provided to cover or plug the apertures 330. If using a plug, this plug can be in the form of a one-way valve or any other type of plug as discussed above, and each of the apertures 330 can include the plug or one-way valve therein. The use of a one-way valve allows for drainage from the drainage area and provides a means to prevent any contaminants from entering back through the drainage area. According to one embodiment, one or more of the patches 335 or plugs can be removed, such as the patch 335 or plug facing downward, after installation of the slack adjuster assembly in the brake rigging. This would allow for quicker, unrestricted drainage of the water and/or contaminants from the drainage area of the slack adjuster 300. A single patch 335, or multiple patches 335 can be provided which are configured for covering the apertures 330. After installation, the user would remove one or two of the patches 335 facing the most downward position. This will allow the water and/or contaminants to drain out of the slack adjuster 300. The remaining patches 335 can be left covering the apertures 330 to protect the apertures 330 and prevent any water and/or contaminants from entering into the slack adjuster 300. It can also be appreciated that any combination of plugs 99, one-way valves, and/or patches 335 can be used to sealingly and/or removably engage the apertures 98, 330.

According to a further embodiment, one or more of the apertures 330 can be filled with a sealant, such as an epoxy or any other known sealant material, which can be removed or "popped out" of the aperture 330 to enable drainage therethrough. According to yet another embodiment, the plug can be in the form of a rounded, low-profile button shaped plug, such as shown in FIG. 8.

In addition to the drainage systems 95, 310 and the vented end caps 100, 200, described in detail above, various interior sealing arrangements can be provided to prevent fluid and/or contaminants from entering into and accumulating in the critical operating area of the slack adjuster 10, 300.

According to one embodiment, the conical spring seat 76 can be a rubberized washer. The rubberized washer can include a rubber material, such as nitrile, Viton, EPDM, and the like, which is associated with the inner portion and outer portion of the washer. It can be appreciated that the rubber material can be associated with the washer by any known technique, such as molded, vulcanized, glued, fastened, and the like. The rubberized inner portion and outer portion form sealing mechanisms on the spring seat 76. Also, the rubberized portion on the washer inner portion acts as a splash guard, as well as preventing the accumulation of materials, water, contaminants, etc. from moving from the main spring housing 20, 320 into the cone nut housing 22 which contains the critical operating area 70 of the slack adjuster 10, 300. During assembly of the main spring housing 20 with the cone nut housing 22, the mating surfaces of the housings compress the rubber of the spring seat 76 into any remaining open areas between the housings 20, 22, sealing the area from any water intrusion from either the threads or from contaminants going over or under outer diameter of the spring seat 76. The rubber material located on the inner diameter of the spring seat 76 acts as a guard against splashing or rolling water from entering through the central opening of the spring seat 76. The rubber material on the inner diameter can be configured according to several embodiments. According to one embodiment, the material can simply make contact with the threaded rod. According to another embodiment, the rubber material can be threaded to interlock with the rod. According to yet another embodiment, the rubber material can be oversized to act as a mitigator of contaminants rather than a full sealing system.

Figure 9:
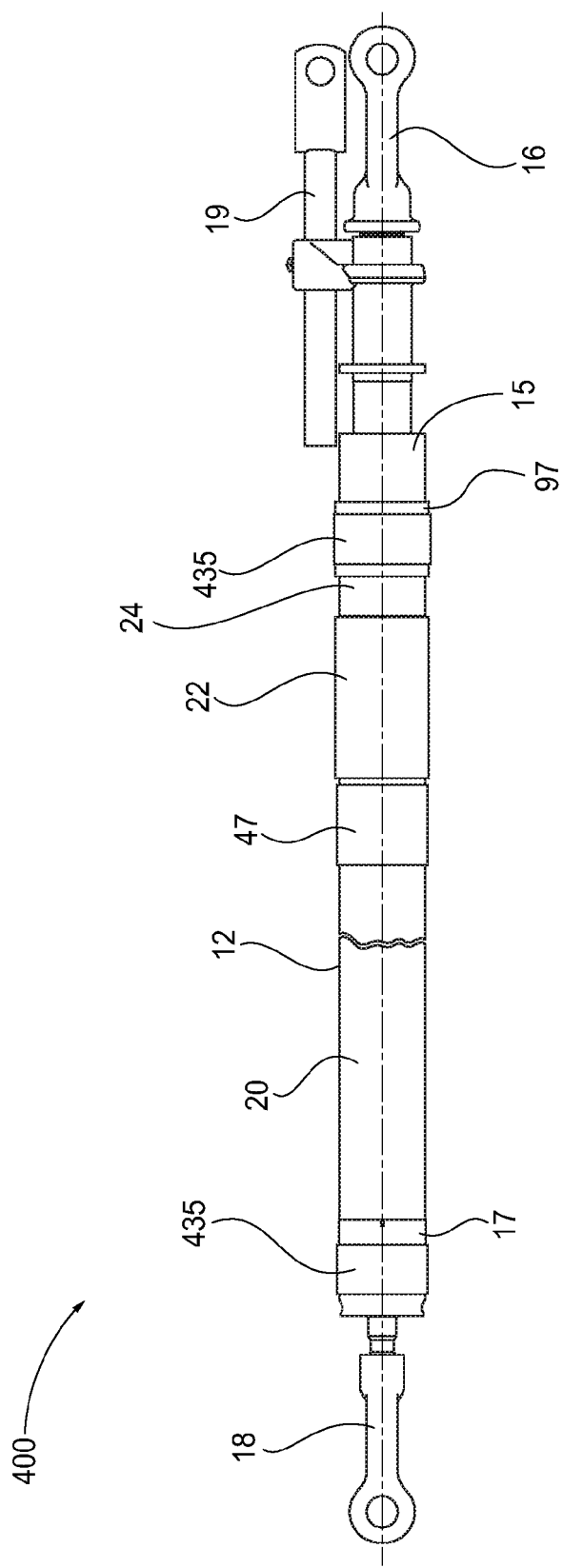
FIG. 9 is a perspective view of a double acting automatic slack adjuster for use with a railway brake rigging including a vented end cap and a drainage system in accordance with an embodiment of the present disclosure.
Figure 10:
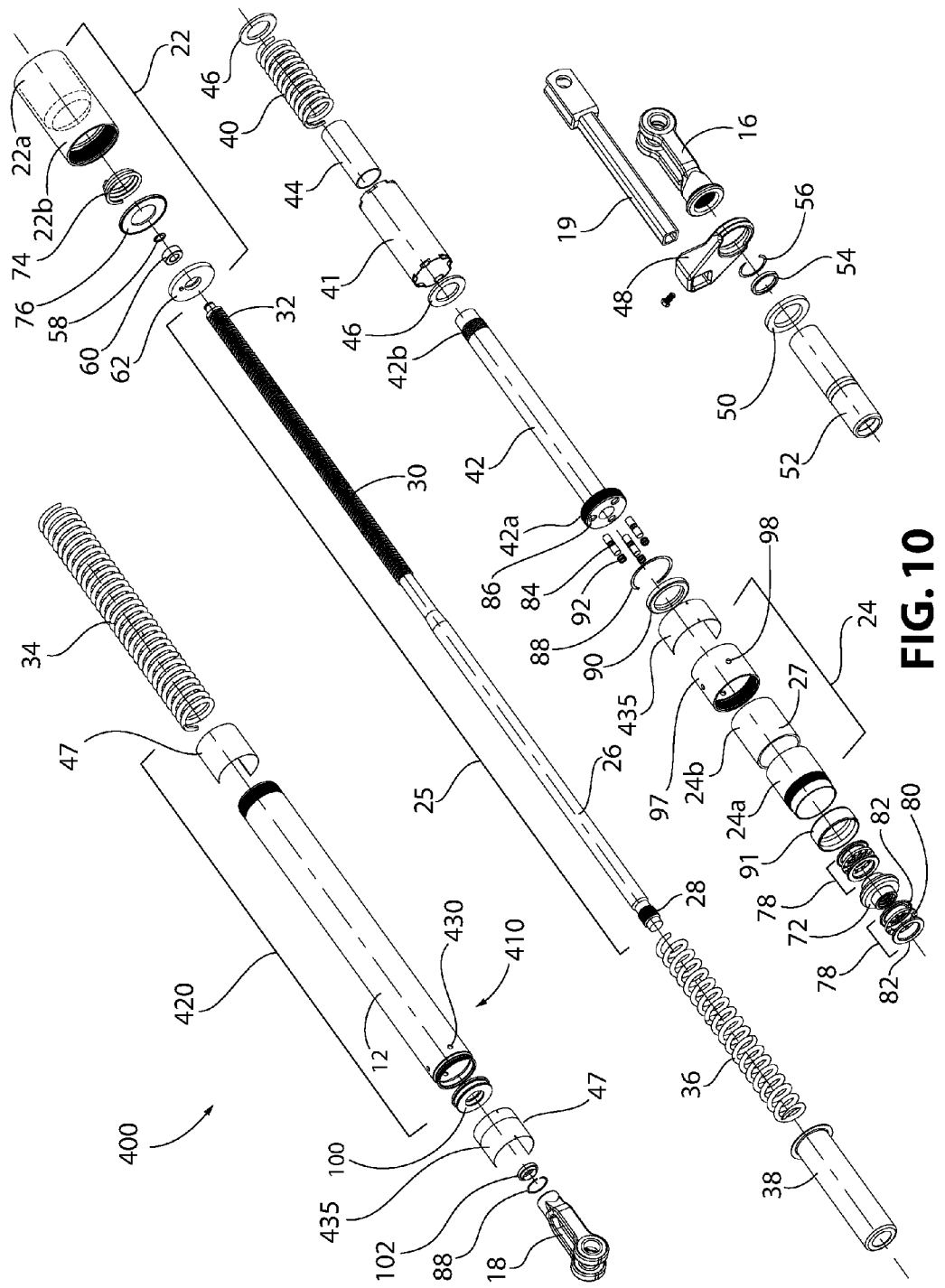
FIG. 10 is an expanded perspective view of the slack adjuster of FIG. 9 in accordance with an embodiment of the present disclosure.

Reference is now made to FIGS. 9 and 10, which show a double-acting slack adjuster, generally indicated as 400, including a drainage system, in accordance with another embodiment of the present disclosure. The slack adjuster includes a drainage system, generally indicated as 410, configured to allow fluid and/or contaminates to drain out of the main spring housing 420 of the slack adjuster 400 to reduce exposure of the critical operating area 70, as shown in detail in FIG. 1A, to fluid and/or contaminants With continuing reference to FIGS. 9 and 10, the slack adjuster 400 is similar to the slack adjusters discussed in detail above with regard to FIGS. 1-3 and FIG. 8, where like reference numerals denote like components. One difference between the slack adjuster 400 and the slack adjuster shown in FIG. 8, is the use of a single patch 435, shown in detail in FIG. 11, to cover apertures 430 in the main spring housing 420. This slack adjuster 400 also differs from the slack adjuster shown in FIG. 8 in that apertures 430 are formed directly in the sidewall of the main spring housing 420 and the location of these apertures 430 are located toward the second end 17 of the main spring housing 420. It can be appreciated that these drainage apertures 430 can be provided at any location along the main spring housing, including but not limited to the first end 15, second end 17, or a central portion, as shown in FIG. 8, of the main spring housing 320, 420. Also, it can be appreciated that the multiple patches 335 shown in FIG. 8 can be replaced with the single patch 435, shown in FIGS. 9 and 10. Additionally, the plugs 99, shown in FIG. 8, which are used for closing the apertures 98 in the plug housing 97 that encompasses the over travel housing portion 24 can be replaced with the single patch 435, as shown in FIGS. 9 and 10. As stated above, the present invention encompasses designs which do not include a plug housing 97, but wherein the apertures 98 are formed directly in the wall portion of the over travel housing portion 24.

The single patch 435 can be sized such that it encompasses approximately ¾ of the circumference of the main spring housing 420 or the over travel housing 24, the plug housing 325 encompassing the main spring housing 320, shown in FIG. 8, or the plug housing 27 encompassing the over travel housing 24. Thus, the single patch 435 covers all but at least one aperture 430, 98. According to one embodiment, the single patch 435 would cover three of the four apertures 430, 98. According to another embodiment, the single patch 435 would cover all but one or a few apertures, so that upon installation, the uncovered area will be facing in a downward direction, allowing for drainage through these apertures. As shown in FIG. 11, the patch 435 can include labelling directing the installer as to which direction to secure the slack adjuster within the braking system.

One material that can be used to form the patches 335, 435 can be 3M™ FRA Railcar tape, which is common in the freight industry and is typically used for FRA regulations on railcars and locomotives. For example, the material used to form the patches can be 3M™ Scotchcal™ Series 8000-10 and can include a poly over laminate. It can be appreciated that other materials and/or tapes can be used to form the patches 335, 435 as long as the material has sufficient strength and holding characteristics capable of withstanding the environmental and mechanical conditions to which it will be exposed.

According to another embodiment, the sealing system can include a sealing member configured for cooperating with at least one of the first end 22a and the second end 22b of the cone nut housing portion 22. According to one design, the sealing member can comprise an O-ring and/or a sealing material associated with the first end 22a of the cone nut housing portion 22. It can be appreciated that the sealing members can be any known sealing members including gaskets, O-rings, rubber sealant material, adhesive sealing compound, and the like.

According to another design, the sealing member can cooperate with the threads located at the first end 42a of the rod guide 42 which interengage with the threads located at the first end 22a of the cone nut housing portion 22. According to one design, a thread locking sealing material such as Loctite® can be positioned around the threads of the rod guide 42. In this design, the sealing member forms an interactive seal between the threads of the rod guide and the threads at the first end 22a of the cone nut housing portion 22 to prevent fluid and/or contaminants from entering the cone nut housing portion 22 through the cooperating threads.

As discussed above, the first end 42a of the rod guide 42 can include at least one trigger pin 84 located within an aperture 86 in the first end 42a of the rod guide 42. The slack adjuster 10 can include a plurality of trigger pins 84, each of which are located within an aperture 86 in the first end 42a of the rod guide. According to yet another design, the sealing system can include at least one O-ring 92, or multiple O-rings, as needed, associated with a body portion of the at least one trigger pin 84 to prevent fluid and/or contaminants from entering the cone nut housing portion 22 through the aperture 86 in the rod guide 42. It can be appreciated that the O-ring can be formed from any well-known materials such as ethylene propylene diene monomer (EPDM), nitrile, fluoroelastomers such as Viton® or FKM (fluoroelastomers), silicone and the like.

It can be appreciated that any of the sealing systems described above can be used alone or cumulatively in any combination to achieve the necessary sealing of the slack adjuster assembly 10 so as to protect the critical operating area 70 from fluid and/or contaminants. It can also be appreciated that the slack adjuster 10, 300 can include sealing systems using sealing members located at other locations along the housing member 12 of the slack adjuster 10, 300, such as in cooperation with the main housing portion 20, 320 and/or the over travel housing portion 24 as long as these sealing members prevent the entrance of fluids and/or contaminants from entering into the critical operating area 70 of the slack adjuster 10. Furthermore, any of the sealing systems or drainage systems described above can be used alone or cumulatively in any combination, with or without the vented end cap.

While the present disclosure is satisfied by embodiments in many different forms, there is shown in the drawings, and described herein in detail, the preferred embodiments of the disclosure, with the understanding that the present disclosure is to be considered as exemplary of the principles of the disclosure and is not intended to limit the disclosure to the embodiments illustrated. Various other embodiments will be apparent to and readily made by those skilled in the art without departing from the scope and spirit of the disclosure. The scope of the disclosure will be measured by the appended claims and their equivalents.

The Invention claimed is:

1. An end cap for a main spring housing of a slack adjuster, the end cap including an inner portion having an inner seal surface configured for cooperating with an elongated rod member and an outer seal surface configured for cooperating with an inner surface of a sidewall located at an end portion of the main spring housing, wherein the end cap is radially interior to the main spring housing, and wherein the end cap includes at least one opening configured to allow fluid and/or contaminants to drain therethrough and out of both the end cap and the main spring housing.

2. The end cap of claim 1, wherein the at least one opening comprises a radially extending aperture in fluid communication with the inner portion and the outer seal surface.

3. The end cap of claim 2, wherein the radially extending aperture is positioned at a location to allow the fluid and/or contaminants to drain out of the inner portion of the end cap prior to breaching the inner seal.

4. The end cap of claim 2, wherein the radially extending aperture is associated with an aperture extending through the sidewall located at the end portion of the main spring housing.

5. The end cap of claim 2, wherein the at least one opening includes a plurality of openings and wherein each of said openings includes a radially extending aperture associated therewith.

6. The end cap of claim 2, further comprising a longitudinally extending aperture in fluid communication with the radially extending aperture and an interior of the main spring housing, wherein the longitudinally extending apertures is capable of draining fluid and/or contaminants out of the main spring housing.

7. The end cap of claim 1, wherein the at least one opening comprises a cut-out portion in the outer seal surface.

8. The end cap of claim 1, wherein the at least one opening further comprises a channel formed in the outer seal surface, the channel being defined by a first lip portion and a second lip portion.

9. The end cap of claim 8, wherein the first lip portion has a first height and the second lip portion has a second height and wherein the first height is less than the second height.

10. The end cap of claim 9, wherein the cap is associated with the main spring housing such that the first lip portion faces in an outward direction with respect to the interior of the main spring housing and the second lip portion faces the interior of the main spring housing.

11. The end cap of claim 8, wherein the at least one opening further includes a cut-out portion in the outer seal surface, wherein the cut-out portion extends through the first and second lip portion in a direction that is perpendicular with respect to the channel.

12. The end cap of claim 11, wherein the at least one opening comprises a plurality of cut-out portions.

13. The end cap of claim 8, wherein the inner portion comprises an inner channel defined by a first ledge portion and a second ledge portion, wherein the first ledge portion defines a first diameter and the second ledge portion defines a second diameter, and wherein the first diameter is greater than the second diameter.

14. The end cap of claim 13, wherein the channel defines a third diameter that is greater than the first and second diameters.

15. The end cap of claim 8, wherein the channel defined by the first lip portion and the second lip portion is integrally formed with the cap.

16. The end cap of claim 8, wherein the second lip portion includes an angled surface.

17. A drainage system for use with a slack adjuster for a railway brake rigging, the slack adjuster including at least a main spring housing and a cone nut housing enclosing a critical operating area of the slack adjuster, wherein the critical operating area includes components configured to operate together to adjust the brake rigging, the drainage system including an end cap having an inner portion having an inner seal surface configured for cooperating with an elongated rod member and an outer seal surface configured for cooperating with an inner surface of a sidewall located at an end portion of the main spring housing, the end cap being radially interior to the main spring housing and the end cap including at least one opening configured to allow fluid and/or contaminants to drain therethrough and out of both the main spring housing and the end cap to reduce exposure of components within the main spring housing and exposure of the critical operating area of the slack adjuster to the fluid and/or contaminants.

18. The drainage system of claim 17, wherein the at least one opening comprises a radially extending aperture in fluid communication with the inner portion and the outer seal surface and the system further includes an aperture extending through the sidewall located at the end portion of the main spring housing in alignment with the radially extending aperture through the end cap, and wherein the radially extending aperture is positioned at a location to allow the fluid and/or contaminants to drain out of the inner portion of the end cap and the housing sidewall prior to breaching the inner seal.

19. The drainage system of claim 18, further comprising a longitudinally extending aperture in fluid communication with the radially extending aperture and an interior of the main spring housing, wherein the longitudinally extending aperture is capable of draining fluid and/or contaminants out of the main spring housing.

20. The drainage system of claim 17, wherein the at least one opening further comprises a channel formed in the outer seal surface, said channel being defined by a first lip portion having a first height and a second lip portion having a second height, wherein the first height is less than the second height.

21. The drainage system of claim 20, wherein the end cap is associated with the main spring housing such that the first lip portion faces in an outward direction with respect to the interior of the main spring housing and the second lip portion faces the interior of the main spring housing.

22. The drainage system of claim 18, wherein the at least one opening further includes a cut-out portion in the outer seal surface wherein the cut-out portion extends through the first and second lip portions in a direction that is perpendicular with respect to the channel.

23. The drainage system of claim 17, wherein the inner portion comprises an inner channel defined by a first ledge portion having a first diameter and a second ledge portion having a second diameter, and wherein the first diameter is greater than the second diameter.

24. The drainage system of claim 23, wherein the channel defines a third diameter that is greater than the first and second diameters.

25. A method of preventing the accumulation of fluid and/or contaminants within a slack adjuster and for protecting a critical operating area of the slack adjuster, the slack adjuster including a main spring housing having an end cap cooperating with an inner surface of a sidewall of the main spring housing and a cone nut housing enclosing the critical operating area of the slack adjuster, the method comprising positioning the end cap radially interior to the main spring housing and providing at least one opening in the end cap, the at least one opening being configured to allow fluid to drain out of both the end cap and main spring housing to reduce exposure of components within the main spring housing and exposure of the critical operating area of the slack adjuster to the fluid and/or contaminants.

26. The method of claim 25, wherein the end cap comprises an inner portion having an inner seal surface configured for cooperating with an elongated rod member and an outer seal surface configured for cooperating with the inner surface of the sidewall located at an end portion of the main spring housing, and wherein the at least one opening comprises at least one of a radially extending aperture in fluid communication with the inner portion and the outer seal surface, at least one cut-out portion in the outer seal surface, and a channel in the outer seal surface defined by a first lip portion and a second lip portion.

27. A double acting tension actuatable slack adjuster to adjust the slack in a railway vehicle brake linkage, the slack adjuster comprising:
(a) an elongated hollow cylindrical housing member which is restrained against rotation and pivotally connectable at a first end thereof, the elongated hollow cylindrical housing including a main spring housing having an end cap at an end thereof and located radially interior to the main spring housing, a cone nut housing, and an over travel housing;
(b) an elongated rod member extending through the end cap, the rod member being restrained against rotation and pivotally connectable at a first end thereof, the rod member having at least a portion thereof threaded, the threaded portion of the rod member extending into the housing member through a second end of the housing member;
(c) a cone lock nut threadedly engaged with the threaded portion of the rod member intermediate a first and second end thereof, the cone lock nut axially movable for rotating about the threaded portion of the rod member to change the length of the slack adjuster by changing the relative longitudinal position between the housing member and the rod member, the cone lock nut being located within the cone nut housing;
(d) at least a first spring for urging the cone lock nut into a first position with respect to the housing member;
(e) a second spring for overcoming a force applied by the first spring and for urging the cone lock nut into a second position; and
(f) at least one drainage system including at least one opening for allowing fluid and/or contaminants to drain out of the slack adjuster, the at least one drainage system being associated with the end cap of the main housing, wherein the end cap includes an outer seal surface for cooperating with an inner surface of a sidewall located at an end portion of the main spring housing, and wherein the fluid and/or contaminants drain out of both the main spring housing and the end cap.

28. The slack adjuster of claim 27, wherein the end cap comprises an inner portion having an inner seal surface configured for cooperating with the elongated rod member and wherein the at least one opening comprises at least one of a radially extending aperture in fluid communication with the inner portion and the outer seal surface, at least one cut-out portion in the outer seal surface, and a channel in the outer seal surface defined by a first lip portion and a second lip portion.

29. The slack adjuster of claim 27, further including at least one opening in the over travel housing portion, said at least one opening configured to allow fluid and/or contaminants to drain through this at least one opening to reduce exposure of the critical operating area of the slack adjuster to the fluid and/or contaminants.

30. The slack adjuster of claim 27, further including at least one opening in the main spring housing, said at least one opening configured to allow fluid and/or contaminates to drain through this at least one opening to reduce exposure of the critical operating area of the slack adjuster to the fluid and/or contaminants.

31. The slack adjuster of claim 29, including at least one of a plug, a one-way valve, and a patch configured for cooperation with the at least one opening in the over travel housing portion.

32. The slack adjuster of claim 30, including at least one of a plug, a one-way valve, and a patch configured for cooperation with the at least one opening in the main spring housing.

33. The slack adjuster of claim 27, including a sealing system configured for cooperating with at least one of the main housing portion, cone nut housing portion, and over travel housing portion to seal the critical operating area against entrance of fluid and/or contaminants therein or to reduce exposure of the critical operating area to fluid and/or contaminants.

* * * * *